United States Patent
Hsu

(10) Patent No.: US 10,295,038 B2
(45) Date of Patent: May 21, 2019

(54) PUSH-TYPE TRANSMISSION MECHANISM

(71) Applicant: MIHUMIS TECHNOLOGY CO., LTD., Taoyuan (TW)

(72) Inventor: Chun-Tang Hsu, Taoyuan (TW)

(73) Assignee: MIHUMIS TECHNOLOGY CO., LTD., Taoyuan (TW)

( * ) Notice: Subject to any disclaimer, the term of this patent is extended or adjusted under 35 U.S.C. 154(b) by 402 days.

(21) Appl. No.: 15/365,248

(22) Filed: Nov. 30, 2016

(65) Prior Publication Data

US 2018/0058565 A1 Mar. 1, 2018

(30) Foreign Application Priority Data

Aug. 29, 2016 (TW) .............................. 105127730 A

(51) Int. Cl.
*F16H 49/00* (2006.01)

(52) U.S. Cl.
CPC ..... *F16H 49/001* (2013.01); *F16H 2049/006* (2013.01)

(58) Field of Classification Search
CPC ... F16H 49/00; F16H 49/001; F16H 2049/003
USPC ........................................................ 74/640
See application file for complete search history.

(56) References Cited

U.S. PATENT DOCUMENTS

| | | | | |
|---|---|---|---|---|
| 4,739,668 A | * | 4/1988 | David | F16H 25/06 |
| | | | | 74/216.3 |
| 9,849,574 B2 | * | 12/2017 | Hecht | B25B 23/141 |
| RE46,863 E | * | 5/2018 | Huang | G03G 15/757 |
| 10,036,452 B2 | * | 7/2018 | Yuan | F16H 15/50 |
| 10,050,510 B2 | * | 8/2018 | Ohhashi | F16H 49/00 |

* cited by examiner

*Primary Examiner* — Ha Dinh Ho
(74) *Attorney, Agent, or Firm* — Rabin & Berdo, P.C.

(57) ABSTRACT

A push-type transmission mechanism has a base, a plurality of fixing discs securely mounted on the base, and a driving component rotatably mounted on the base. The driving component includes a plurality of cam portions. Each fixing disc has a plurality of driven rolling components which can move in radial directions of the fixing discs and can protrude out of outer surfaces by abutment of the cam portions. An inner surface of a transmission block forms a corrugation structure extending continuously in a circumferential direction. The corrugation structure is abutted by the driven rolling components. Thus, speed is changed through the driven rolling component connecting to the corrugation structure. Besides, with the driven rolling components driven by the cam portions, power can be transmitted with high torque.

15 Claims, 13 Drawing Sheets

PUSH-TYPE TRANSMISSION MECHANISM

CROSS-REFERENCE TO RELATED APPLICATIONS

This application is based upon and claims priority under 35 U.S.C. 119 from Taiwan Patent Application No. 105127730 filed on Aug. 29, 2016, which is hereby specifically incorporated herein by this reference thereto.

BACKGROUND OF THE INVENTION

1. Field of the Invention

The present invention relates to a transmission mechanism, especially to a transmission mechanism that connects and drives the components via the abutting of rolling elements.

2. Description of the Prior Arts

The transmission mechanism is an output terminal disposed between a master driver and a device for decreasing speed. The common usage of the transmission mechanism is to decrease an output rotation speed of a prime machine, e.g. engine or motor, which causes a rotation speed of a slave output part, e.g. chuck of a lathe or wheel that is connected to the prime machine, to conform to the demand.

The conventional transmission mechanism transmits power through gearing, which engages teeth of various sizes and numbers between a master driver and a slave part. However, for the gearing transmission mechanism, a production of a gear requires high precision, which causes complicated manufacture processes of the components such that the components are not easily applicable for mass production. Besides, the teeth of the gear may be damaged because of stress concentration and then the driving system is destroyed.

In addition, the output rotation speed of the prime machine can be decreased by the conventional gearing transmission mechanism, but torque of the slave output part is restricted so that the usage of the conventional transmission mechanism is also restricted and the transmission process is not smooth.

To overcome the shortcomings, the present invention provides a transmission mechanism to mitigate or obviate the aforementioned problems.

SUMMARY OF THE INVENTION

The main objective of the present invention is to provide a push-type transmission mechanism that comprises:
a power transmission assembly comprising:
  a base;
  a first fixing disc being an annular object, an end surface of the first fixing disc mounted on the base, and the first fixing disc comprising:
    a plurality of first limiting portions arranged in a circle, spaced apart from each other at intervals, and protruding from an edge of another end surface of the first fixing disc;
  a plurality of driven rolling components, part of the driven rolling components mounted in the intervals of the first limiting portions and being capable of moving in radial directions of the first fixing disc;
  a driving component rotatably mounted on the base and comprising:
    a first cam portion formed on an outer surface of the driving component and abutting on said part of the driven rolling components that are mounted on the first fixing disc; and
    a second cam portion formed on the outer surface of the driving component and adjacent to an end surface of the first cam portion; and
  a second fixing disc, an end surface of the second fixing disc securely connected to the base and facing toward the first fixing disc, the second fixing disc comprising:
    a plurality of second limiting portions arranged in a circle, spaced apart from each other at intervals, and protruding from an edge of the end surface of the second fixing disc; the first limiting portions and the second limiting portion staggered with respect to each other; the remaining driven rolling components, which are other than the ones mounted on the first fixing disc, mounted in the intervals of the second limiting portions and being capable of moving in radial directions of the second fixing disc; each one of the remaining driven rolling components abutting on the second cam portion of the driving component;
  a cover mounted on the base, sleeved on the first fixing disc, and forming:
    an opening at a center of the cover; and
    an output assembly comprising:
    a transmission block rotatably mounted between the second fixing disc and the cover, and forming:
      an output component protruding from a surface of a first end of the transmission block and mounted in the opening of the cover; and
      a corrugation structure formed continuously in a circumferential direction of an inner surface of a second end of the transmission block opposite the first end of the transmission block, the driven rolling components being capable of abutting the corrugation structure.

The present push-type transmission mechanism transmits power and transforms a speed from the power transmission assembly to the output assembly through the driven rolling components mounted movably in radial directions of the first fixing disc and the second fixing disc connected to the corrugation structure of the driving annular wall or the passive rolling components of the transmission block, so that an outer slave component can be driven by the output assembly. Therefore, with the aforesaid transmission, the shortcomings caused by high precision of producing process and the stress concentration are obviated. Besides, because the driving component forms the first cam portion and the second cam portion for abutting and driving the driven rolling components disposed on the first fixing disc and the second fixing disc respectively in radial directions, the torque is still high during transmission.

Other objectives, advantages and novel features of the invention will become more apparent from the following detailed description when taken in conjunction with the accompanying drawings.

DETAILED DESCRIPTION OF THE PREFERRED EMBODIMENTS

Figure 1:
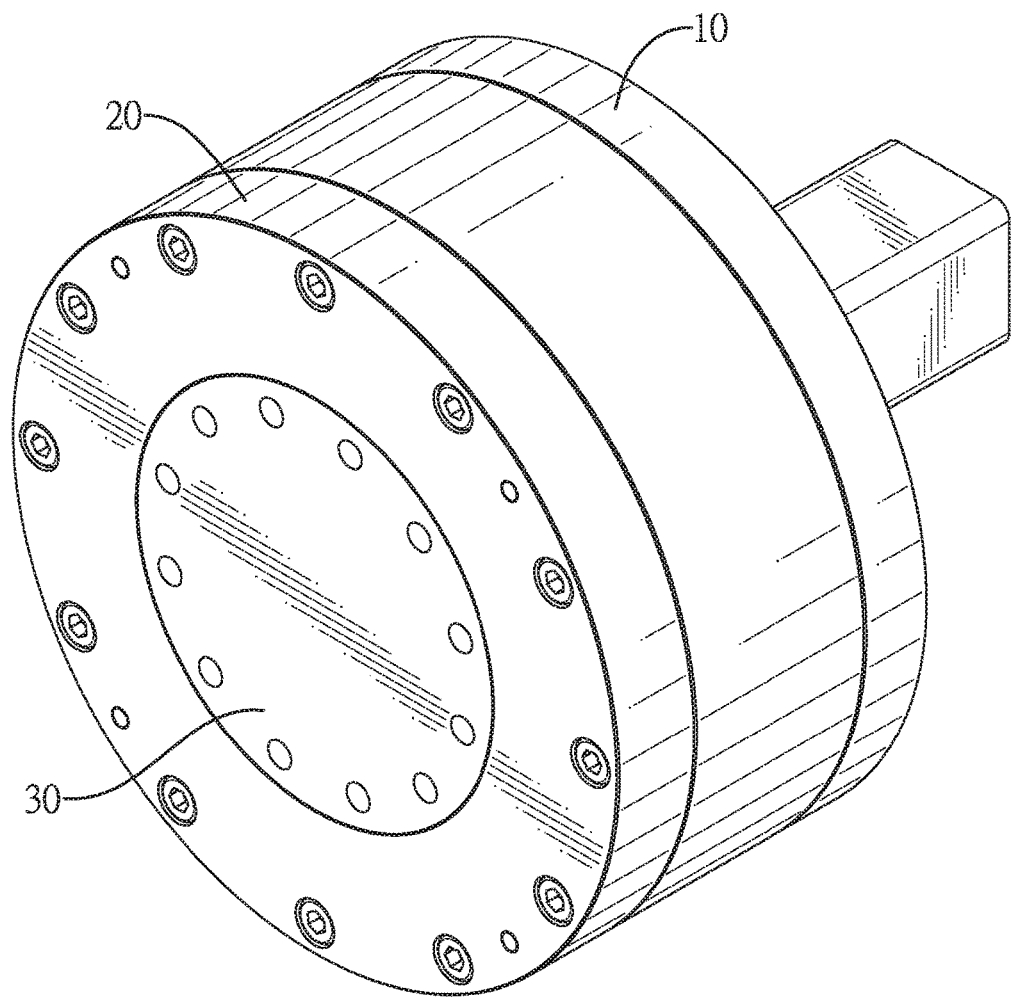
FIG. 1 is a perspective view of a push-type transmission mechanism in accordance with the present invention.

With reference to FIG. 1, a first embodiment of a push-type transmission mechanism in accordance with the present invention is provided with a power transmission assembly 10, a cover 20, and an output assembly 30.

Figure 2:
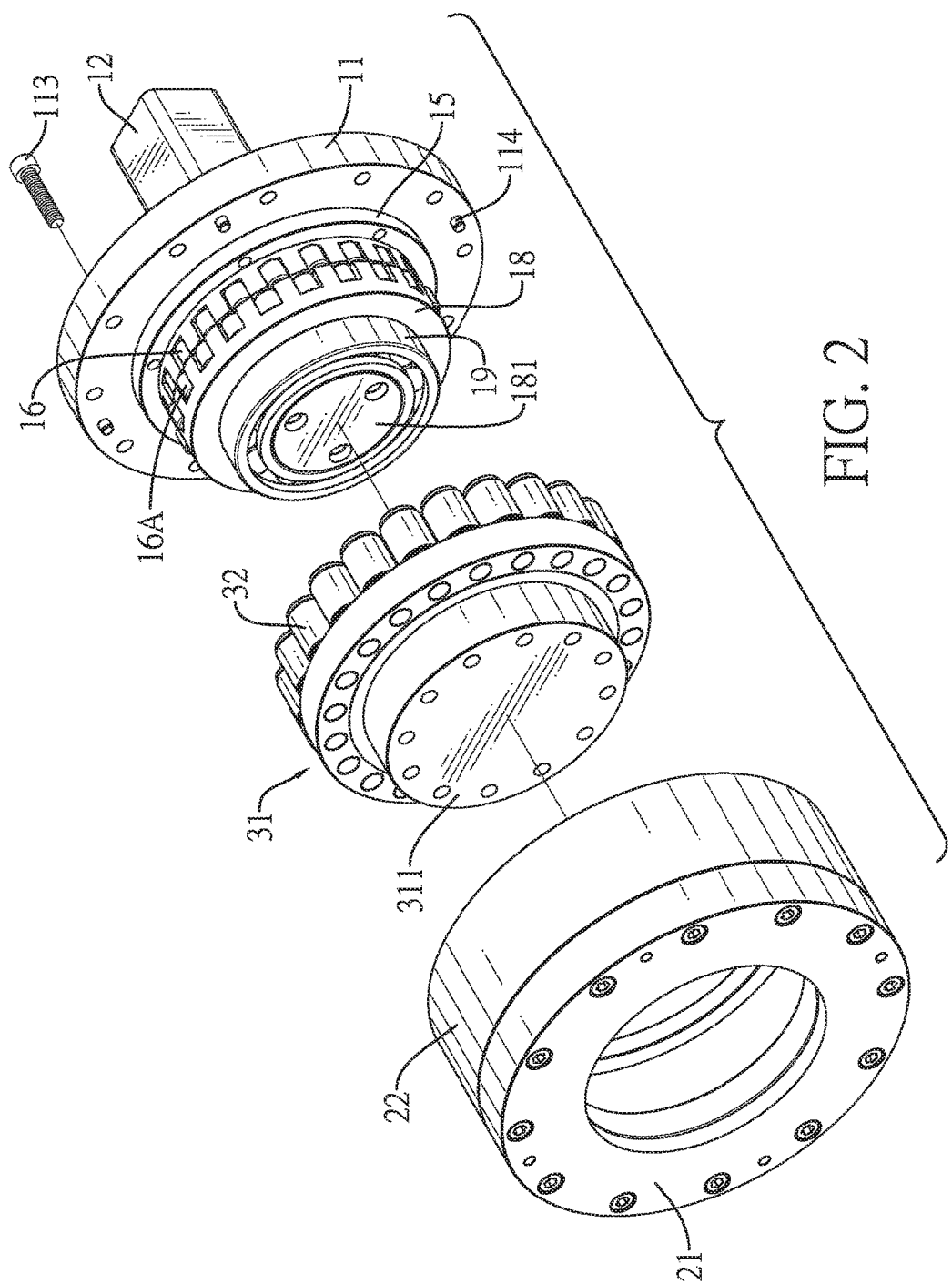
FIG. 2 is an exploded view of FIG. 1.
Figure 4:
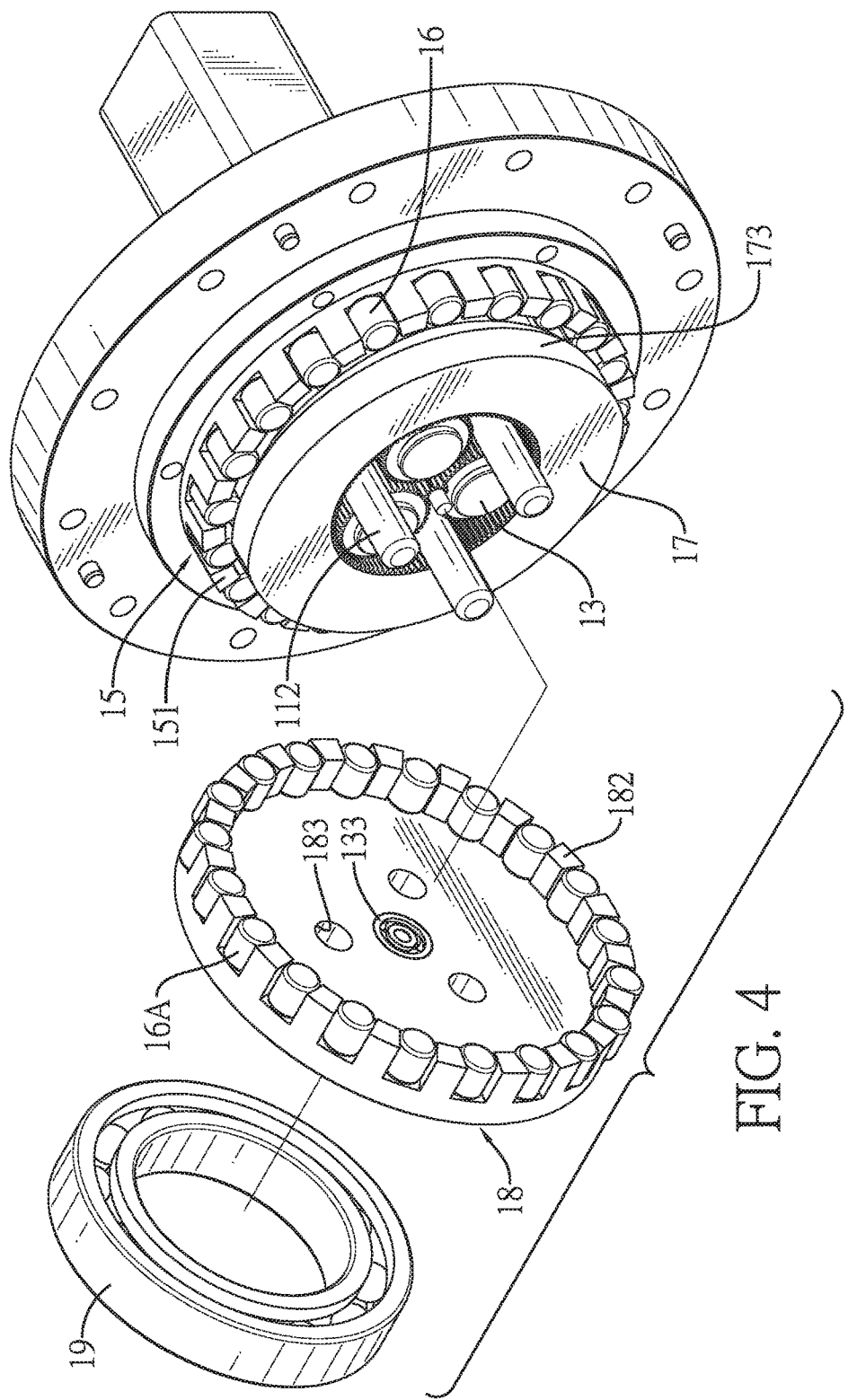
FIG. 4 is an exploded view of the power transmission assembly in FIG. 2.
Figure 6:
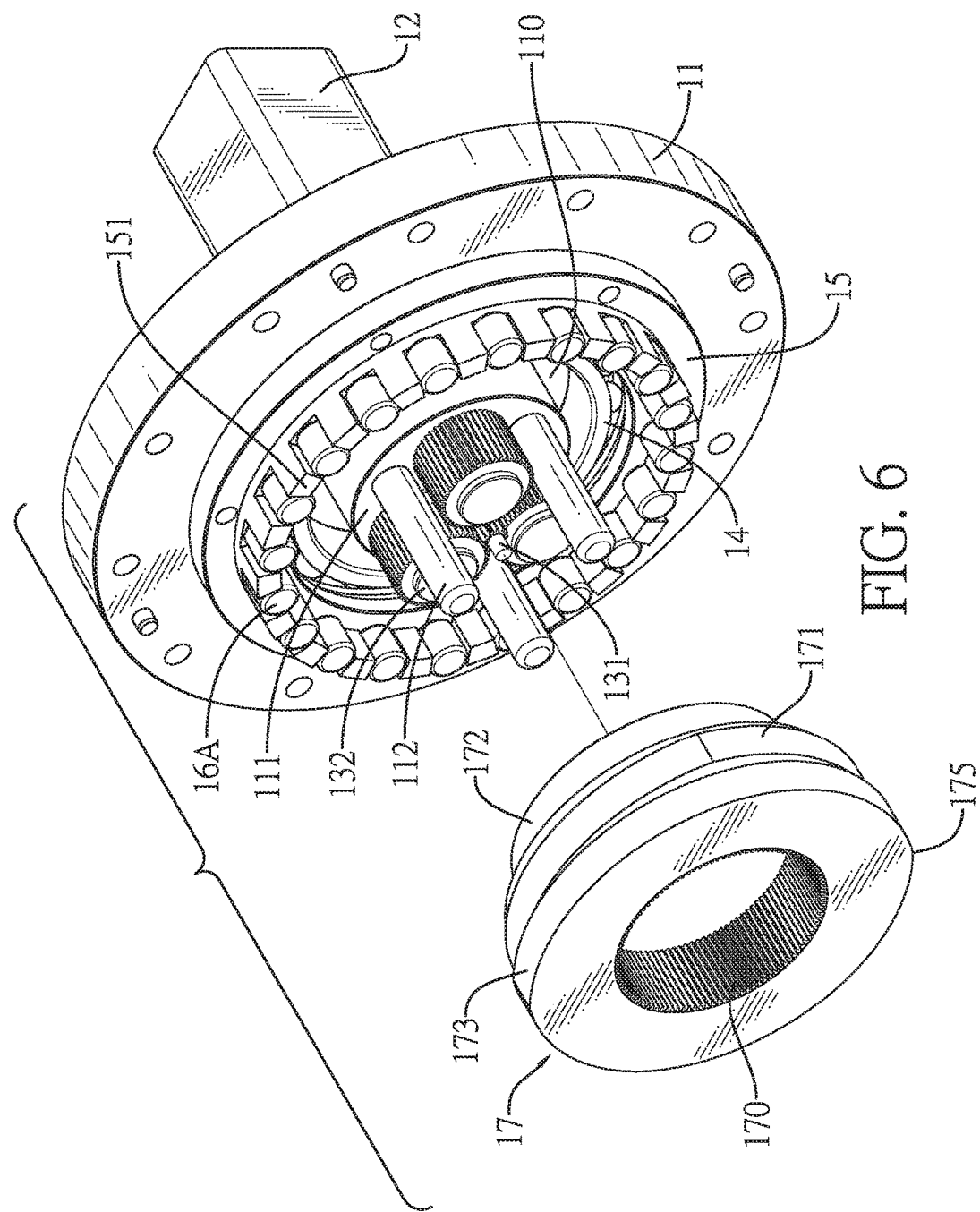
FIG. 6 is a further exploded view of FIG. 4.

Please refer to FIGS. 2, 4, and 6. The power transmission assembly 10 comprises a base 11, a motor 12, a driving gear group 13, a base bearing 14, a first fixing disc 15, a plurality of driven rolling components 16 and 16A, a driving component 17, a second fixing disc 18, and an output bearing 19.

The base 11 comprises an accommodation groove 110, an installing stage 111, at least one installing rod 112, a plurality of combining components 113, and a plurality of locating components 114.

The accommodation groove 110 is concaved on a first end surface of the base 11. The installing stage 111 protrudes from a center of the accommodation groove 110. The at least one installing rod 112 is mounted on an end surface of the installing stage 111. The combining components 113 and the locating component 114 are staggered with respect to each other and arranged in a circle on the first end surface of the base 11.

The motor 12 is mounted on a second end surface of the base 11. The driving gear group 13 is mounted in the center of the accommodation groove 110 of the base 11 and is connected to the motor 12.

Precisely, the driving gear group 13 comprises a gear stud 131, a plurality of passive gears 132, and a gear stud bearing 133.

One end of the gear stud 131 is connected to the motor 12, and the other end of the gear stud 131 is mounted through the end surface of the installing stage 111. The passive gears 132 are spaced apart from each other, are rotatably mounted on the installing stage 111, and are engaged with the gear stud 131.

The base bearing 14 is mounted in the accommodation groove 110 of the base 11.

Figure 9:
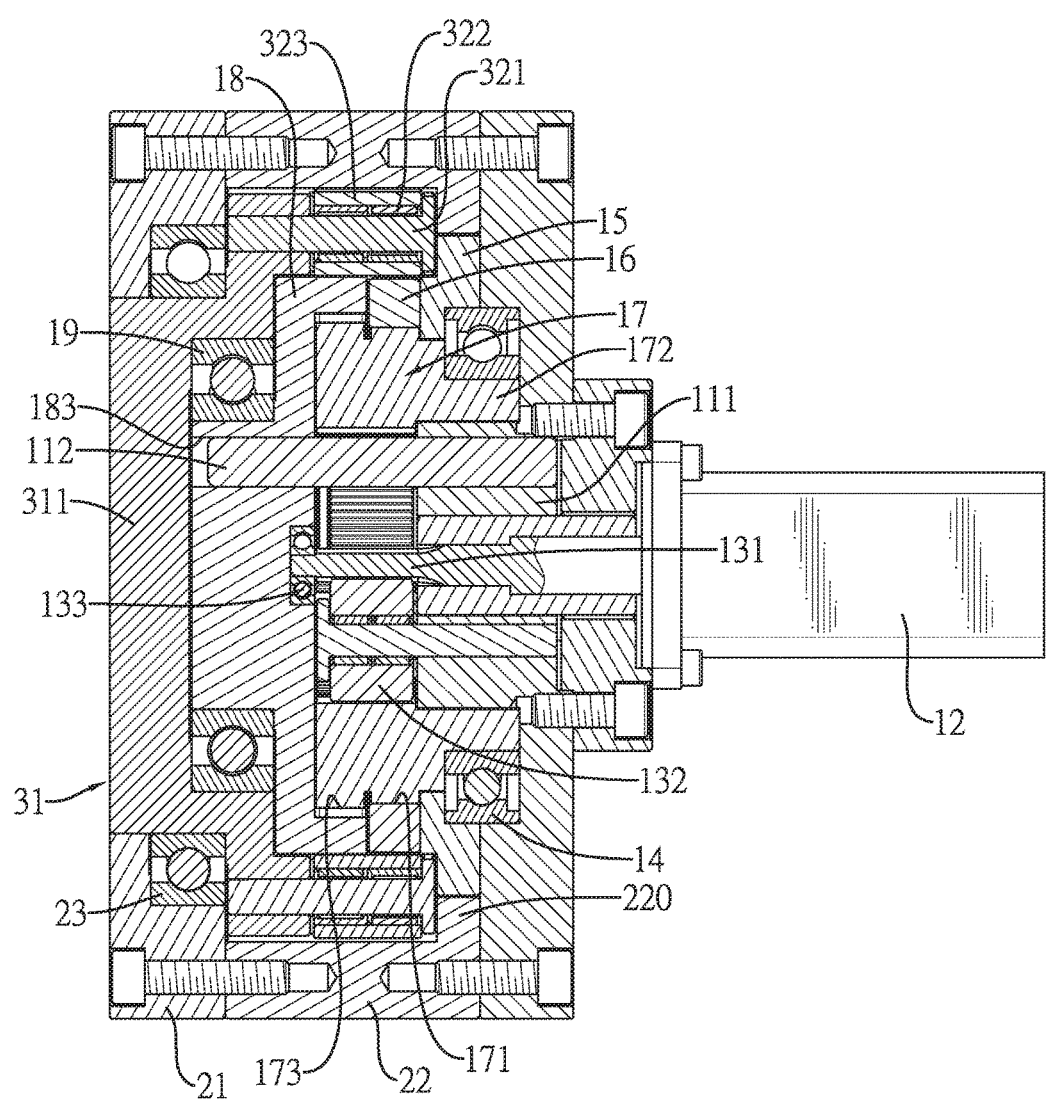
FIG. 9 is a lateral sectional view of the first embodiment in FIG. 8.

Please refer to FIGS. 4, 6, and 9. The first fixing disc 15 is an annular object, is sleeved on the driving gear group 13, and comprises a plurality of first limiting portions 151. An end surface of the first fixing disc 15 is mounted on the base 11.

The first limiting portions 151 are arranged in a circle, are spaced apart from each other, and protrude from an edge of the other end surface of the first fixing disc 15.

Please also refer to FIGS. 4, 6, and 9. The driving component 17 is a hollow block and comprises an engaging portion 170, a first cam portion 171, an installing portion 172, and a second cam portion 173. The driving component 17 is connected to the driving gear group 13 and is rotatably mounted on the base 11.

The engaging portion 170 is formed on an inner surface of the driving component 17 and engaged with the passive gears 132.

The first cam portion 171 is formed on an outer surface of the driving component 17.

The installing portion 172 protrudes from one end surface of the first cam portion 171 and is mounted on an inner surface of the base bearing 14.

The second cam portion 173 is formed on the outer surface of the driving component 17 and adjacent to the other end surface of the first cam portion 171.

Figure 7:
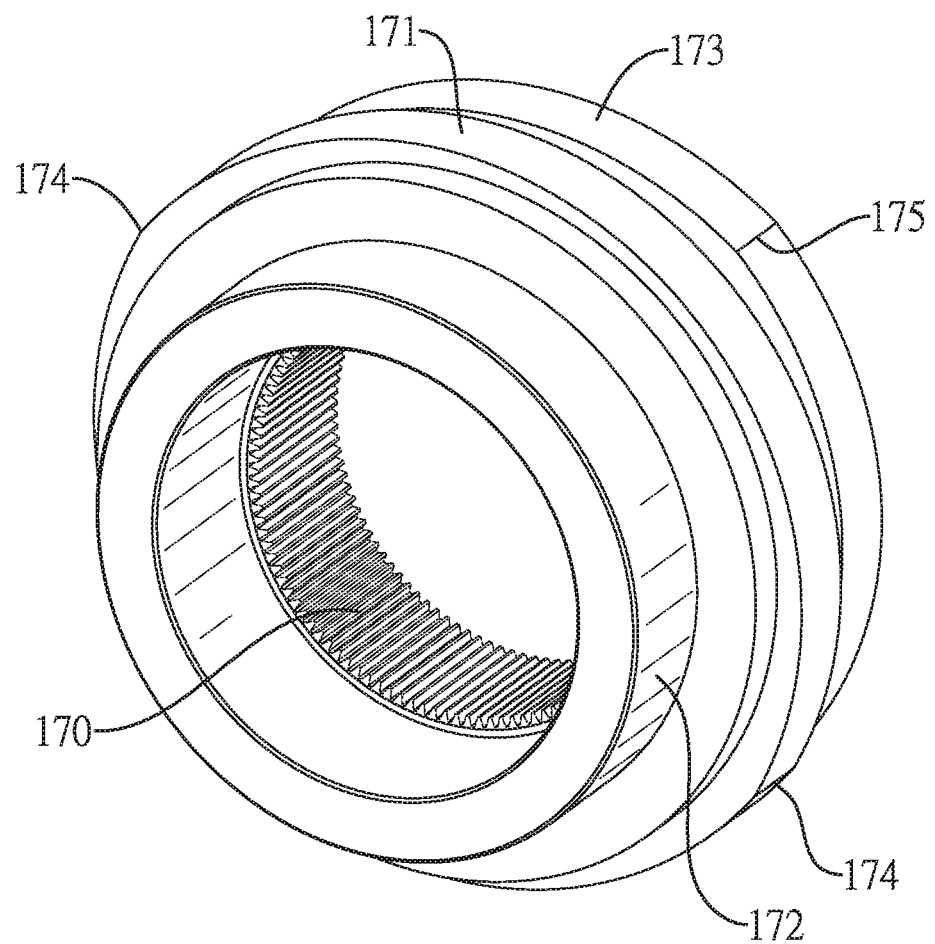
FIG. 7 is a perspective view of the driving component in FIG. 6.

Please refer to FIGS. 6 and 7. The first cam portion 171 of the driving component 17 comprises two first apexes 174. The two first apexes 174 are spaced apart from each other and form two protrusions of a profile of the first cam portion 171. The second cam portion 173 comprises two second apexes 175. The two second apexes 175 are spaced apart from each other and form two protrusions of a profile of the second cam portion 173. The two second apexes 175 and the two first apexes 174 are staggered with respect to each other. In the preferred embodiment, the two second apexes 175 and the two first apexes 174 are spaced apart by 90 degrees.

Figure 5:
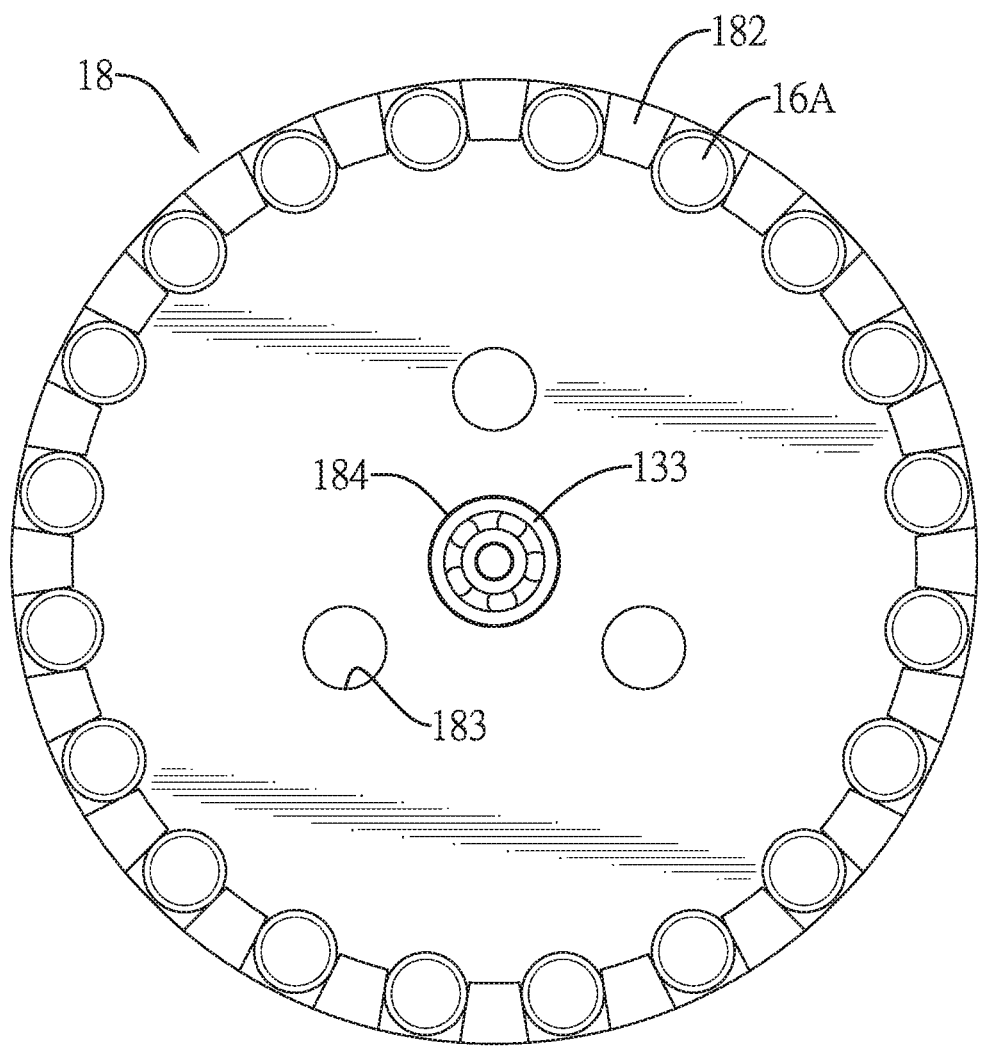
FIG. 5 is a front plane view of the power transmission assembly in FIG. 2.

Please refer to FIGS. 4, 5, and 9. The second fixing disc 18 comprises a mounting portion 181, a plurality of second limiting portions 182, at least one installing hole 183, and a gear stud bearing seat 184.

The mounting portion 181 protrudes from a center of a first end surface of the second fixing disc 18.

The second limiting portions 182 are arranged in a circle and spaced apart from each other, and protrude from an edge of a second end surface of the second fixing disc 18. The second end surface of the second fixing disc 18 is connected to the base 11 and faces toward the first fixing disc 15. The second limiting portions 182 and the first limiting portions 151 are staggered with respect to each other.

The driven rolling components 16 and 16A can be a plurality of balls, needles, or cylinders, and part of the driven rolling components 16 are mounted in the intervals of the first limiting portions 151 and are capable of moving in radial directions of the first fixing disc 15. Each of the driven rolling components 16 abuts the first cam portions 171 of the driving component 17. The remaining driven rolling components 16A are mounted in the intervals of the second limiting portions 182 and are capable of moving in radial directions of the second fixing disc 18. Each of the driven rolling components 16A abuts the second cam portion 173 of the driving component 17.

Figure 10:
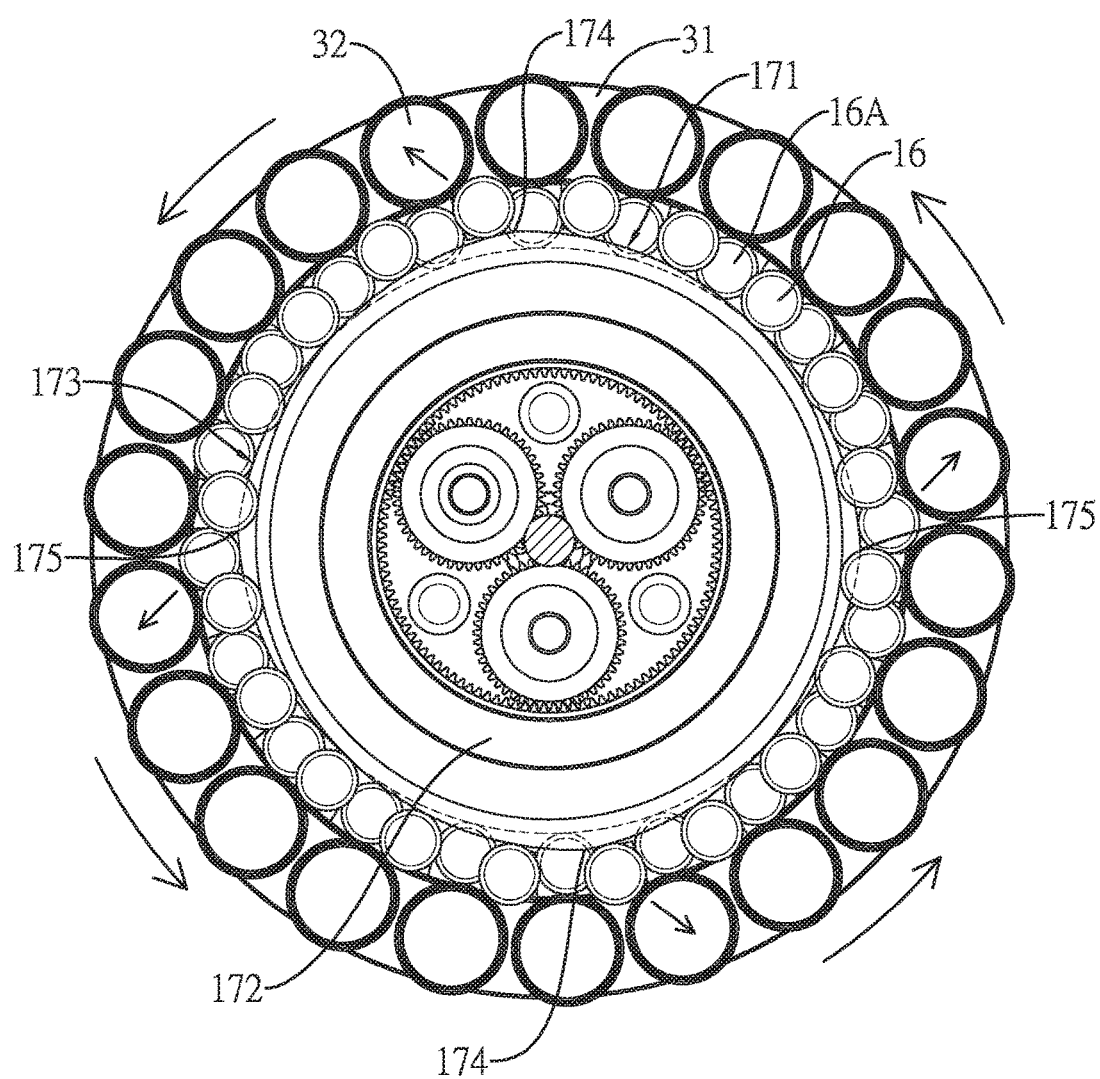
FIG. 10 is an operational view of the first embodiment in FIG. 8, wherein the first fixing disc and the second fixing disc are omitted.

Please also refer to FIGS. 2, 4, and 10. When the two first apexes 174 abut the driven rolling components 16 that are mounted on the first fixing disc 15, the abutted driven rolling components 16 move in the radial directions of the first fixing disc 15 and protrude out of outer surfaces of the first limiting portions 151. And when the two second apexes 175 abut the driven rolling components 16A that are mounted on the second fixing disc 18, the abutted driven rolling components 16A move in the radial directions of the second fixing disc 18 and protrude out of outer surfaces of the second limiting portion 182.

The at least one installing hole 183 is formed through the second fixing disc 18, and the at least one installing rod 112 is mounted in the at least one installing hole 183 for connecting the second fixing disc 18 and the base 11.

The gear stud bearing seat 184 is concaved on a center of the second end surface of the second fixing disc 18. The gear stud bearing 133 is mounted in the gear stud bearing seat 184, and an end of the gear stud 131 is mounted on the gear stud bearing 133.

The output bearing 19 is mounted on an outer surface of the mounting portion 181.

Figure 3:
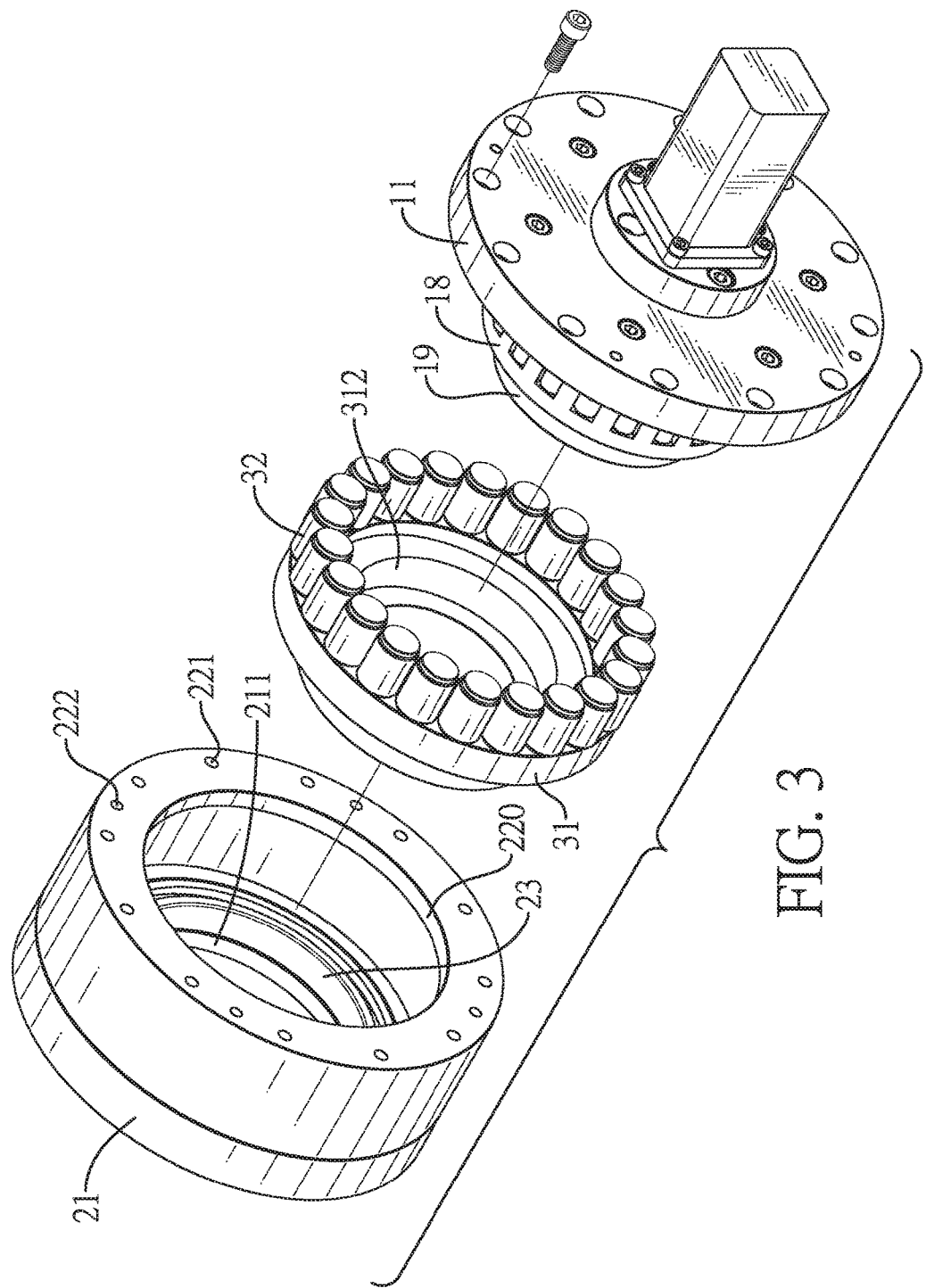
FIG. 3 is another exploded view of FIG. 1.

Please refer to FIGS. 2, 3, and 9. The cover 20 forms an opening at a center of the cover 20 and comprises an installing cap 21, an annular wall component 22, and an installing bearing 23. The cover 20 is mounted on the base 11 and around the first fixing disc 15.

The installing cap 21 is an annular object for forming the opening of the cover 20 and comprises an installing bearing seat 211. The installing bearing seat 211 is concaved on an end surface of the cover 20.

The annular wall component 22 is an annular object and comprises a flange 220, a plurality of mounting holes 221, and a plurality of locating holes 222. A first end of the annular wall component 22 is mounted on the installing cap 21.

The flange 220 protrudes radially inward from an inner surface of an opposite second end of the annular wall component 22.

The mounting holes 221 and the locating holes 222 are staggered with respect to each other and arranged in a circle and concaved on an end surface of the second end of the annular wall component 22. The mounting holes 221 are capable of being mounted on the combining components 113 and the locating holes 222 are capable of being mounted on the locating components 114 so that the cover 20 is mounted on the base 11.

The installing bearing 23 is mounted in the installing bearing seat 211.

Please refer to FIGS. 2, 3, and 9. The output assembly 30 comprises a transmission block 31 and a plurality of passive rolling components 32.

The transmission block 31 comprises an output component 311, an output bearing seat 312, and a corrugation structure extending continuously in a circumferential direction. The transmission block 31 is rotatably mounted between the second fixing disc 18 and the cover 20.

The output component 311 protrudes from a surface of a first end of the transmission block 31. The corrugation structure extending continuously in a circumferential direction is formed on an inner surface of an opposite second end of the transmission block 31. The output component 311 is mounted on the opening of the cover 20 and the corrugation structure of the transmission block 31 at a position abutted by the driven rolling components 16 and 16A that are mounted on the first fixing disc 15 and the second fixing disc 18. The flange 220 of the annular wall component 22 abuts on an end of the corrugation structure of the transmission block 31. Precisely, an outer surface of the output component 311 of the transmission block 31 is mounted on the installing bearing 23, and the output component 311 is mounted on a center of an opening of the installing cap 21 and is capable of connecting with the outer slave component.

The output bearing seat 312 is concaved on a surface of the second end of the transmission block 31. The output bearing 19 is mounted in the output bearing seat 312.

Please also refer to FIGS. 2 and 10. The passive rolling components 32 are arranged in a circle on the surface of the second end of the transmission block 31. Precisely, portions of the passive rolling components 32 that face inward form the corrugation structure of the transmission block 31. The driven rolling components 16 and 16A abutted by the two first apexes 174 of the first cam portion 171 and the two second apexes 175 of the second cam portion 173 abut the passive rolling components 32.

Figure 8:
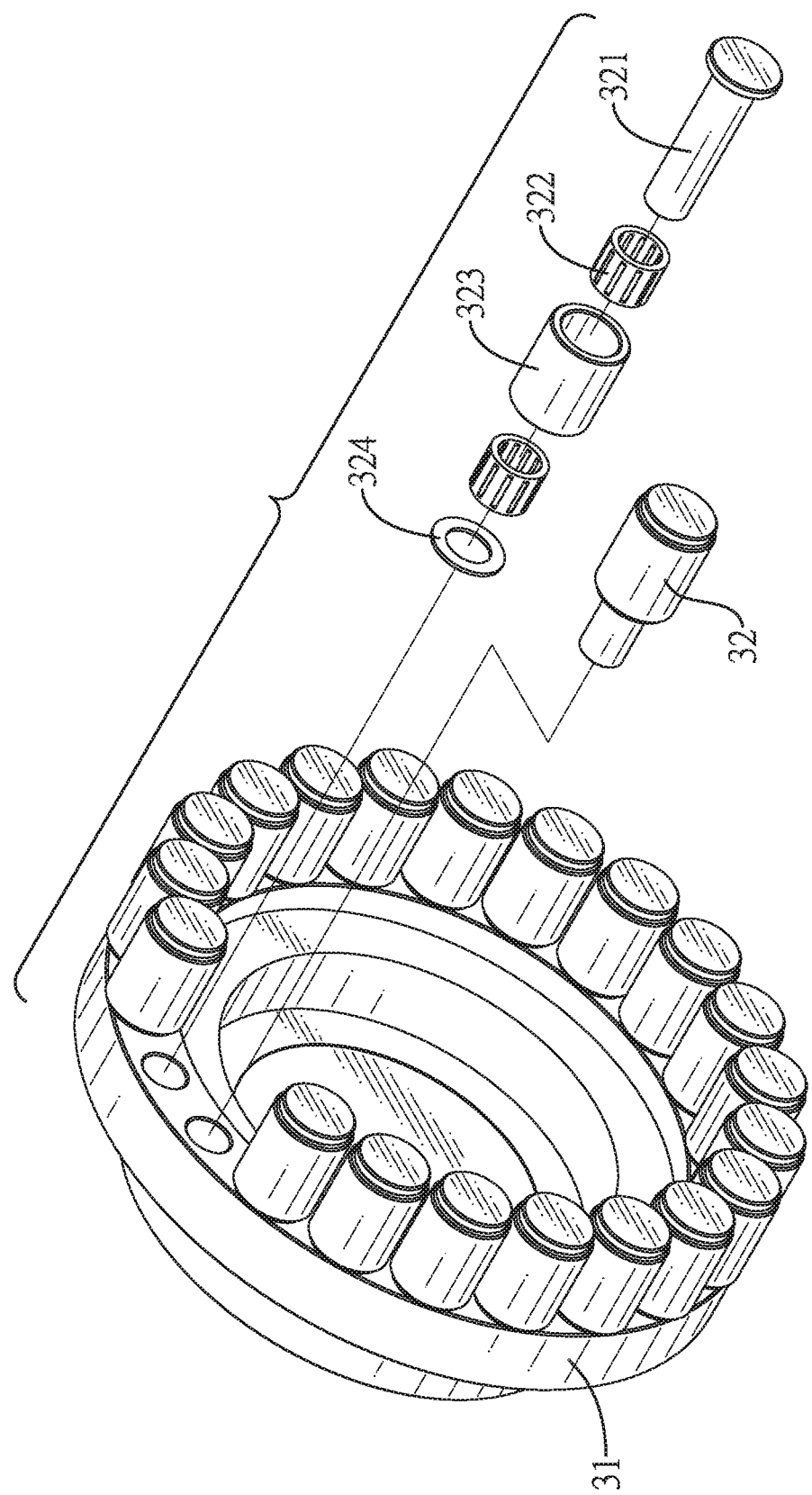
FIG. 8 is an exploded view of the output assembly of the first embodiment in accordance with the present invention.

Please refer to FIGS. 8 and 9. The passive rolling components 32 can be a plurality of balls, needles, or cylinders. In this embodiment, each one of the passive rolling components 32 comprises an assembling component 321, at least one rolling element bearing 322, a rolling element sleeve 323, and a washer 324.

The assembling component 321 is mounted on the surface of the second end of the transmission block 31. The rolling element bearing 322 is mounted on the assembling component 321 and the inner surface of the rolling element bearing 322 is abutted on the assembling component 321. The rolling element sleeve 323 is a hollow tube and is sleeved on an outer surface of the rolling element bearing 322. The driven rolling components 16 and 16A are capable of abutting an outer surface of the rolling element sleeve 323. The washer 324 is sleeved on the assembling component 321, and two sides of the washer 324 are connected to an end surface of the rolling element sleeve 323 and the transmission block 31 respectively.

Figure 11:
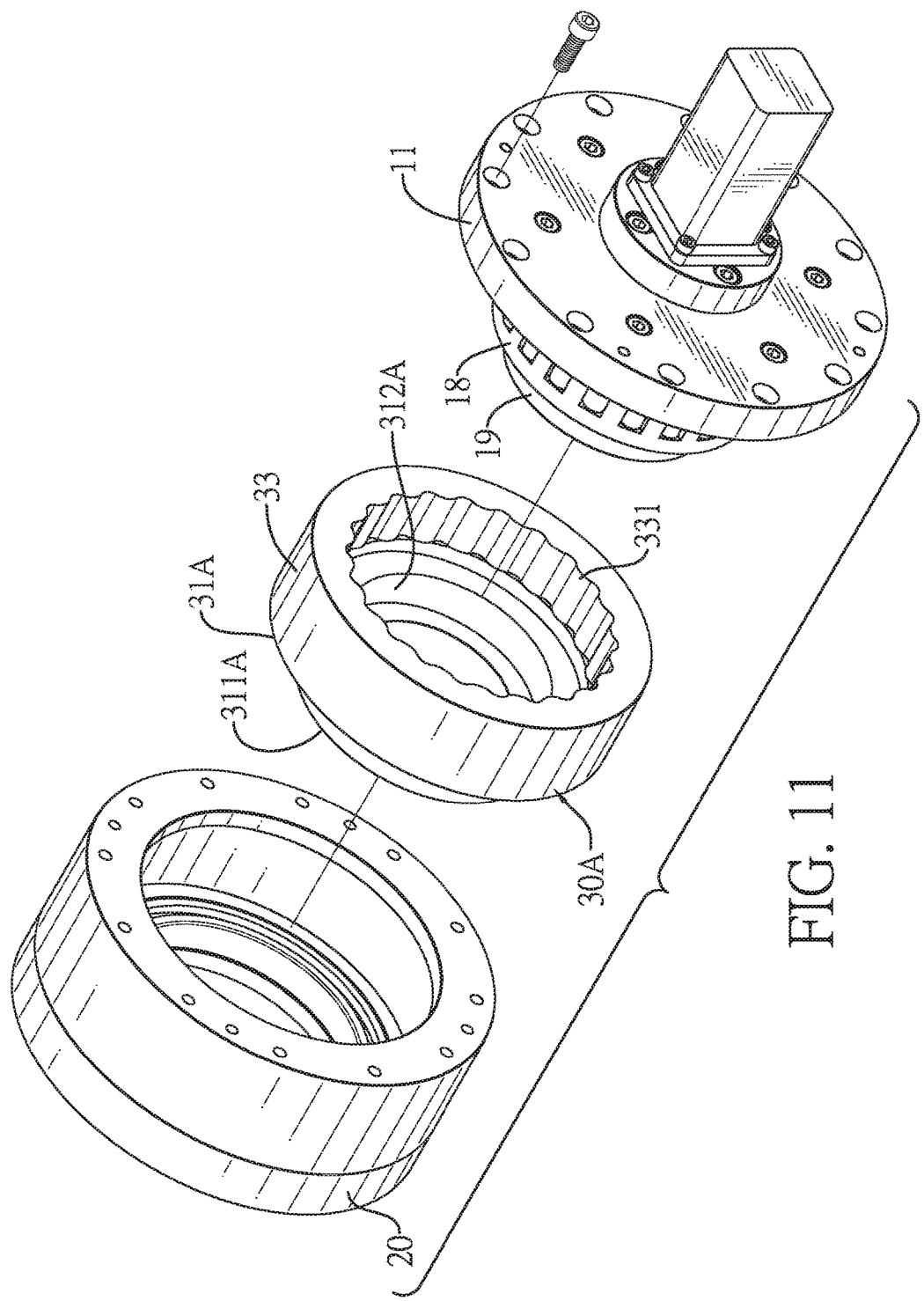
FIG. 11 is an exploded view of the second embodiment in accordance with the present invention.
Figure 12:
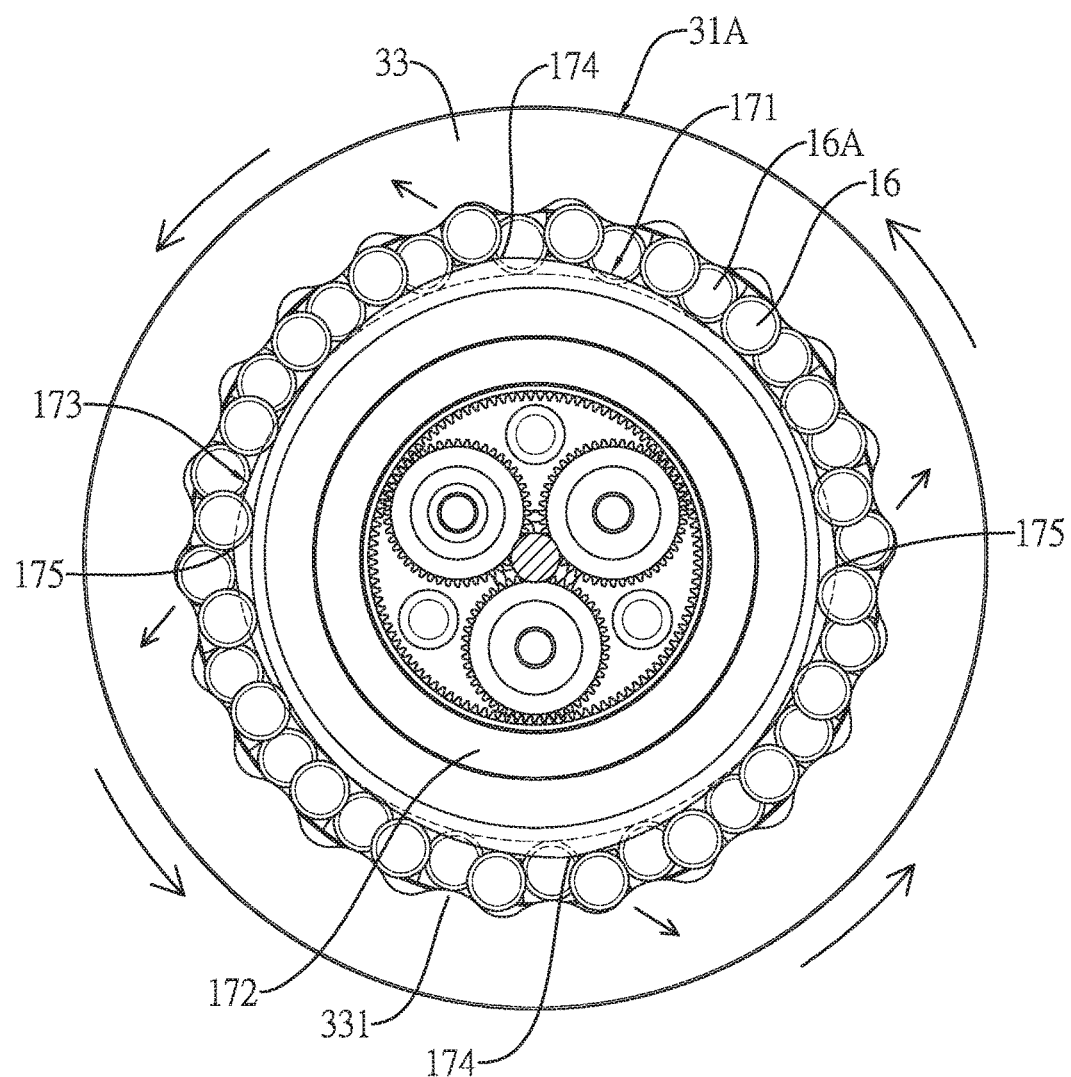
FIG. 12 is an operational view of the second embodiment in FIG. 11, wherein the first fixing disc and the second fixing disc are omitted.
Figure 14:
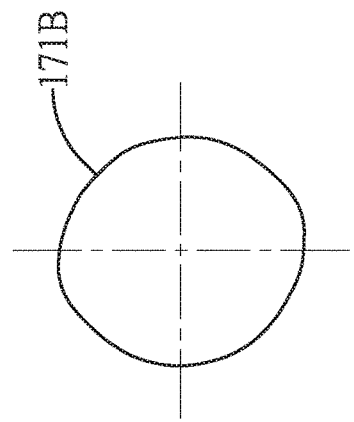
FIGS. 13 to 17 are plane views of the first cam portion of the driving component with different profiles.
Figure 13:
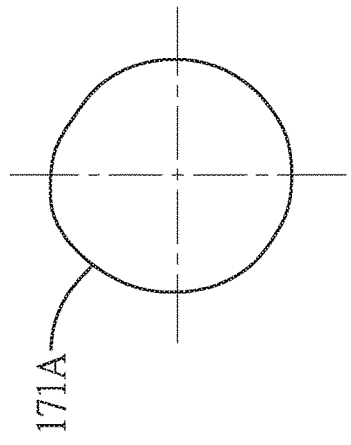
Figure 17:
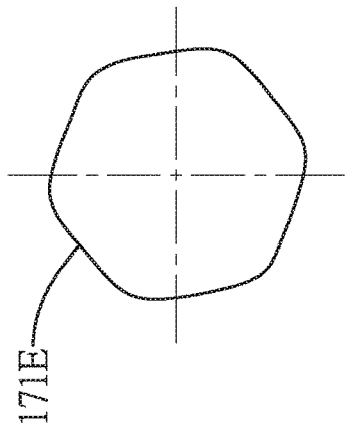
Figure 16:
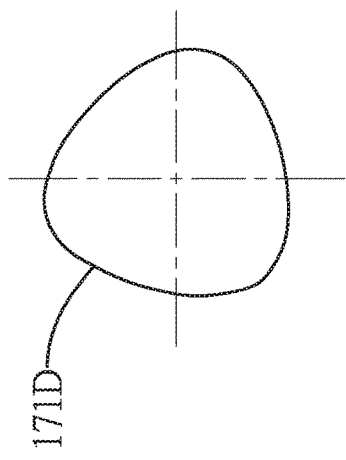
Figure 15:
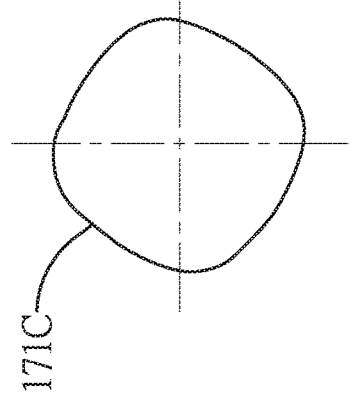

Please refer to FIGS. 11 and 12. A second embodiment of the present push-type transmission mechanism is provided. The second embodiment is similar to the first embodiment, but the main difference is that the transmission block 31A of the output assembly 30A comprises a driving annular wall 33 for substituting the passive rolling components 32. The driving annular wall 33 is annular, axially protrudes from the transmission block 31A, and comprises a plurality of annular gear teeth 331. The annular gear teeth 331 are spaced apart from each other and protrude inward from an inner surface of the driving annular wall 33. Thus, the annular gear teeth 331 constitute the corrugation structure of the transmission block 31A. The driven rolling components 16 and 16A are abutted by the two first apexes 174 of the first cam portion 171, and the two second apexes 175 of the second cam portion 173 abut the annular gear teeth 331. Structures of the output component 311A and the output bearing seat 312A of the transmission block 31A of the second embodiment and relations between the output component 311A, the output bearing seat 312A, the cover 20, and the output bearing seat 19 are same as those of the output component 311 and the output bearing seat 312 of the transmission block 31 of the first embodiment, so detailed descriptions thereof would be omitted.

However, the profiles of the first cam portion 171 and the second cam portion 173 of the driving component 17 are not limited by the disclosure of the drawings. Please refer to FIGS. 13 to 17. In other embodiments, the profile of the first cam portion 171 of the driving component 17 may be droplet-shaped 171A, oval 171B, square 171C, triangular 171D, or hexagonal 171E, and the profile of the second cam portion 173 also may be droplet-shaped (not illustrated in the drawings), oval (not illustrated), square (not illustrated), triangular (not illustrated), or hexagonal (not shown in the drawings). In addition, the profiles of the first cam portion 171 and the second cam portion 173 are not limited to be the same. For example, the first cam portion 171 may be droplet-shaped 171A and the second cam portion 173 may be oval, the first cam portion 171 may be square 171C and the second cam portion 173 may be hexagonal, or the first cam portion 171 may be droplet-shaped 171A and the second cam portion 173 may be square.

The driven rolling components 16 and 16A are movably mounted in the radial directions of the first fixing disc 15, the second fixing disc 18 connects to the passive rolling component 32 mounted on the transmission block 31, or the driven rolling components 16 and 16A connect to the driving annular wall 33 of the transmission block 31A, and thus, the rotating speed is changed and the power is transmitted from the driving gear group 13 to the transmission block 31. In that process, the rotation movement of the driving gear group 13 is transformed into radial movements of the driven rolling components 16 and 16A. Then, the driven rolling components 16 and 16A abut the corrugation structure in the transmission block 31 or 31A, causing the radial movements of the driven rolling components 16 and 16A to be transformed into rotational movements of the transmission block 31 or 31A. Therefore, input rotational speed of the driving gear group 13 can be transferred and the output assembly 30 or 30A drives the outer slave component to rotate. As the shortcomings of the gearing transmission mechanism are mitigated by the present invention, the manufacturing process is simplified so that the present invention avoids the high-precision requirement of the producing process and the stress concentration that breaks down the mechanism.

Then please refer to FIGS. 2, 10, and 10. Because the profiles of the two first apexes 174 of the first cam portion 171 and the two second apexes 175 of the second cam portion 173 can abut the driven rolling components 16 and 16A on the first fixing disc 15 and the second fixing disc 18, when the driving component 17 is rotating, the driven rolling components 16 and 16A are pushed out four times by the first fixing disc 15 and the second fixing disc 18 and protrude out of the outer surfaces of the first fixing disc 15 and the second fixing disc 18, which causes the driven rolling components 16 and 16A to abut the passive rolling component 32 or the annular gear teeth 331 for driving the transmission block 31 or 31A to rotate. Therefore, the present invention transmits power with high torque.

Even though numerous characteristics and advantages of the present invention have been set forth in the foregoing description, together with details of the structure and features of the invention, the disclosure is illustrative only. Changes may be made in the details, especially in matters of shape, size, and arrangement of parts within the principles of the invention to the full extent indicated by the broad general meaning of the terms in which the appended claims are expressed.

What is claimed is:

1. A push-type transmission mechanism comprising:
   a power transmission assembly comprising:
     a base;
     a first fixing disc being an annular object, an end surface of the first fixing disc mounted on the base, and the first fixing disc comprising:
       a plurality of first limiting portions arranged in a circle, spaced apart from each other at intervals, and protruding from an edge of another end surface of the first fixing disc;
     a plurality of driven rolling components, part of the driven rolling components mounted in the intervals of the first limiting portions and being capable of moving in radial directions of the first fixing disc;
     a driving component rotatably mounted on the base and comprising:
       a first cam portion formed on an outer surface of the driving component and abutting on said part of the driven rolling components that are mounted in the intervals of the first fixing disc; and
       a second cam portion formed on the outer surface of the driving component and adjacent to an end surface of the first cam portion; and
     a second fixing disc, an end surface of the second fixing disc securely connected to the base and facing toward the first fixing disc, the second fixing disc comprising:
       a plurality of second limiting portions arranged in a circle, spaced apart from each other at intervals, and protruding from an edge of the end surface of the second fixing disc; the first limiting portions and the second limiting portion staggered with respect to each other; the remaining driven rolling components, which are other than the ones mounted on the first fixing disc, mounted in the intervals of the second limiting portions and being capable of moving in radial directions of the second fixing disc; each one of the remaining driven rolling components abutting on the second cam portion of the driving component;
   a cover mounted on the base, sleeved on the first fixing disc, and forming:
     an opening at a center of the cover; and
   an output assembly comprising:
     a transmission block rotatably mounted between the second fixing disc and the cover, and forming:
       an output component protruding from a surface of a first end of the transmission block and mounted in the opening of the cover; and
       a corrugation structure formed continuously in a circumferential direction of an inner surface of a second end of the transmission block opposite the first end of the transmission block, the driven rolling components being capable of abutting the corrugation structure.

2. The push-type transmission mechanism as claimed in claim 1, wherein:
   the first cam portion of the driving component comprises:
     two first apexes spaced apart from each other and forming two protrusions on a profile of the first cam portion, thereby making the driven rolling components that are mounted on the first fixing disc move in the radial directions of the first fixing disc and protrude out of the first limiting portions with the abutting by the two first apexes; and
   the second cam portion of the driving component comprises:
     two second apexes spaced apart from each other and forming two protrusions on a profile of the second cam portion, thereby making the driven rolling components that are mounted on the second fixing disc move in the radial directions of the second fixing disc and protrude out of the second limiting portions with the abutting by the two second apexes;
   wherein the first apexes and the second apexes are staggered with respect to each other.

3. The push-type transmission mechanism as claimed in claim 2, wherein the output assembly further comprises:
   a plurality of passive rolling components arranged in a circle on a surface of the second end of the transmission block, and thereby portions of the passive rolling components that face inward forming the corrugation structure of the transmission block and the driven rolling components abutting the passive rolling components along with the abutting of the two first apexes of the first cam portion and the two second apexes of the second cam portion.

4. The push-type transmission mechanism as claimed in claim 3, wherein each one of the passive rolling components comprises:
   an assembling component mounted on the surface of the second end of the transmission block;
   at least one rolling element bearing mounted on the assembling component and an inner surface of the rolling element bearing abutting the assembling component;
   a rolling element sleeve being a hollow tube and sleeved on an outer surface of the rolling element bearing; the driven rolling components being capable of abutting an outer surface of the rolling element sleeve;
   a washer sleeved on the assembling component, and two sides of the washer connected to an end surface of the rolling element sleeve and the transmission block respectively.

5. The push-type transmission mechanism as claimed in claim 2, wherein the transmission block of the output assembly comprises:
   a driving annular wall being annular and axially protruding from the second end of the transmission block and forming:
      a plurality of annular gear teeth spaced apart from each other and protruding inward from an inner surface of the driving annular wall, and thereby the annular gear teeth constituting the corrugation structure of the transmission block and the driven rolling component abutting the annular gear teeth along with the abutting of the two first apexes of the first cam portion and the two second apexes of the second cam portion.

6. The push-type transmission mechanism as claimed in claim 1, wherein:
   the base comprises:
      an accommodation groove concaved on a first end surface of the base;
   the second fixing disc comprises:
      a mounting portion protruding from a center of another end surface of the second fixing disc;
   the power transmission assembly further comprises:
      a motor mounted on a second end surface of the base;
      a driving gear group mounted in a center of the accommodation groove and connected to the motor; the first fixing disc sleeved on the driving gear group;
      a base bearing mounted in the accommodation groove; and
      an output bearing mounted on an outer surface of the mounting portion;
   the driving component is connected to the driving gear group and further comprises:
      an installing portion protruding from another end surface of the first cam portion and mounted on an inner surface of the base bearing; and
   the transmission block further comprises:
      an output bearing seat concaved on a center of the surface of the second end of the transmission block, and the output bearing mounted in the output bearing seat.

7. The push-type transmission mechanism as claimed in claim 5, wherein:
   the base comprises:
      an accommodation groove concaved on a first end surface of the base;
   the second fixing disc comprises:
      a mounting portion protruding from a center of another end surface of the second fixing disc;
   the power transmission assembly further comprises:
      a motor mounted on a second end surface of the base;
      a driving gear group mounted in a center of the accommodation groove and connected to the motor; the first fixing disc sleeved on the driving gear group;
      a base bearing mounted in the accommodation groove; and
      an output bearing mounted on an outer surface of the mounting portion;
   the driving component is connected to the driving gear group and further comprises:
      an installing portion protruding from another end surface of the first cam portion and mounted on an inner surface of the base bearing; and
   the transmission block further comprises:
      an output bearing seat concaved on a center of the surface of the second end of the transmission block, and the output bearing mounted in the output bearing seat.

8. The push-type transmission mechanism as claimed in claim 6, wherein:
   the base further comprises:
      an installing seat protruding from the center of the accommodation groove; and
      at least one installing rod mounted on an end surface of the installing seat;
   the driving gear group comprises:
      a gear stud, an end of the gear stud connected to the motor, another end of the gear stud mounted through the end surface of the installing seat;
      a plurality of passive gears spaced apart from each other, rotatably mounted on the installing seat, and engaged with the gear stud; and
      a gear stud bearing;
   the driving component is a hollow block and further comprises:
      an engaging portion formed on an inner surface of the driving component and engaged with the passive gears; and
   the second fixing disc further comprises:
      at least one installing hole formed through the second fixing disc; the at least one installing rod mounted in the at least one installing hole;
      a gear stud bearing seat concaved on a center of the end surface of the second fixing disc such that the end surface forms the second limiting portions, the gear stud bearing seat mounted in the gear stud bearing seat, and an end of the gear stud mounted on the gear stud bearing.

9. The push-type transmission mechanism as claimed in claim 7, wherein:
   the base further comprises:
      an installing seat protruding from the center of the accommodation groove; and
      at least one installing rod mounted on an end surface of the installing seat;
   the driving gear group comprises:
      a gear stud, an end of the gear stud connected to the motor, another end of the gear stud mounted through the end surface of the installing seat;
      a plurality of passive gears spaced apart from each other, rotatably mounted on the installing seat, and engaged with the gear stud; and
      a gear stud bearing;
   the driving component is a hollow block and further comprises:

an engaging portion formed on an inner surface of the driving component and engaged with the passive gears; and the second fixing disc further comprises:
at least one installing hole formed through the second fixing disc; the at least one installing rod mounted in the at least one installing hole;
a gear stud bearing seat concaved on a center of the end surface of the second fixing disc such that the end surface forms the second limiting portions, the gear stud bearing seat mounted in the gear stud bearing seat, and an end of the gear stud mounted on the gear stud bearing.

10. The push-type transmission mechanism as claimed in claim 8, wherein the cover comprises:
an installing cap being an annular object for forming the opening of the cover and comprising:
an installing bearing seat concaved on an end surface of the cover;
an annular wall component being an annular object, a first end of the annular wall component mounted on the installing cap, and the annular wall component comprising:
a flange protruding from an inner surface of a second end of the annular wall component and abutting on the second end of the transmission block;
an installing bearing mounted in the installing bearing seat; an outer surface of the output component of the transmission block mounted on the installing bearing and in a center of the installing cap.

11. The push-type transmission mechanism as claimed in claim 9, wherein the cover comprises:
an installing cap being an annular object for forming the opening of the cover and comprising:
an installing bearing seat concaved on an end surface of the cover;
an annular wall component being an annular object, a first end of the annular wall component mounted on the installing cap, and the annular wall component comprising:
a flange protruding from an inner surface of a second end of the annular wall component and abutting on the second end of the transmission block;
an installing bearing mounted in the installing bearing seat; an outer surface of the output component of the transmission block mounted on the installing bearing and in a center of the installing cap.

12. The push-type transmission mechanism as claimed in claim 10, wherein:
the base further comprises:
a plurality of combining components; and
a plurality of locating components;
wherein the combining components and the locating components are staggered with respect to each other and arranged in a circle on the first surface of the base;
the annular wall component of the cover further comprises:
a plurality of mounting holes; and
a plurality of locating holes;
wherein the mounting holes and the locating holes are staggered with respect to each other and arranged in a circle and concaved on an end surface of the second end of the annular wall component; the mounting holes correspond to the combining components in location and the locating holes correspond to the locating components in location.

13. The push-type transmission mechanism as claimed in claim 11, wherein:
the base further comprises:
a plurality of combining components; and
a plurality of locating components;
wherein the combining components and the locating components are staggered with respect to each other and arranged in a circle on the first surface of the base;
the annular wall component of the cover further comprises:
a plurality of mounting holes; and
a plurality of locating holes;
wherein the mounting holes and the locating holes are staggered with respect to each other and arranged in a circle and concaved on an end surface of the second end of the annular wall component; the mounting holes correspond to the combining components in location and the locating holes correspond to the locating components in location.

14. The push-type transmission mechanism as claimed in claim 1, wherein:
the profile of the first cam portion of the driving component is droplet-shaped, oval, square, triangular, or hexagonal; and
the profile of the second cam portion is droplet-shaped, oval, square, triangular, or hexagonal.

15. The push-type transmission mechanism as claimed in claim 13, wherein:
the profile of the first cam portion of the driving component is droplet-shaped, oval, square, triangular, or hexagonal; and
the profile of the second cam portion is droplet-shaped, oval, square, triangular, or hexagonal.

* * * * *